United States Patent [19]

Watanabe

[11] Patent Number: 5,562,872
[45] Date of Patent: Oct. 8, 1996

[54] A METHOD FOR MANUFACTURING AN ANTIBACTERIAL CHOPPING BOARD

[75] Inventor: Tadao Watanabe, Tsuchiura, Japan

[73] Assignee: Daikyo Co., Ltd., Tsuchiura, Japan

[21] Appl. No.: 406,050

[22] Filed: Mar. 17, 1995

Related U.S. Application Data

[62] Division of Ser. No. 57,677, May 5, 1993, Pat. No. 5,433,424.

[30] Foreign Application Priority Data

Feb. 16, 1993 [JP] Japan ..................... 5-48783

[51] Int. Cl.$^6$ ............... B23Q 3/00; B29B 7/52; B29C 43/02
[52] U.S. Cl. .......... 264/145; 264/162; 264/175; 264/325; 264/331.13; 264/331.16; 264/349; 269/286; 269/289 R; 524/322; 524/540
[58] Field of Search ...................... 264/349, 138, 264/145, 162, 175, 325, 320, 331.13, 331.16; 269/286, 289 R; 524/322, 450

[56] References Cited

U.S. PATENT DOCUMENTS

| | | | |
|---|---|---|---|
| 4,452,936 | 6/1984 | Grimm | 524/322 |
| 4,960,819 | 10/1990 | Sandstrom et al. | 524/516 |
| 5,085,416 | 2/1992 | Miyake et al. | 269/289 R |
| 5,162,425 | 11/1992 | Sandstrom et al. | 524/516 |

FOREIGN PATENT DOCUMENTS

| | | | |
|---|---|---|---|
| 55-632 | 2/1980 | Japan . | |
| 1-46464 | 2/1989 | Japan . | |
| 1-185226 | 7/1989 | Japan | 269/289 R |
| 2-71717 | 3/1990 | Japan | 269/289 R |
| 2-295524 | 12/1990 | Japan | 269/289 R |
| 3-193014 | 8/1991 | Japan | 269/289 R |
| 3-193015 | 8/1991 | Japan | 269/289 R |
| 3-195522 | 8/1991 | Japan | 269/289 R |
| 3-198822 | 8/1991 | Japan | 269/289 R |
| 2250909 | 1/1992 | United Kingdom | 269/289 R |

*Primary Examiner*—Jay H. Woo
*Assistant Examiner*—Duane S. Smith
*Attorney, Agent, or Firm*—Dilworth & Barrese

[57] ABSTRACT

A chopping board of the present invention is formed in a manner that synthetic rubber (NBR) and hard chloroethene as a basis are kneaded into wherein an anti-bacterial agent is mixed. Definitely, a stiffening agent of synthetic rubber, low-pressure polyethylene resin, white carbn black which is the reinforcing extender of rubber, zinc flower as a reinforcing accelerator of rubber, titanium as a coloring agent and stearic acid as a dispersion accelerator are mixed with the base of synthetic rubber (NBR) and hard vinyl chloride. The mixture thus obtained is agitated under kneading by a kneader exclusively for rubber and then a ceramic power and an inorganic antibacterial agent are mixed with the kneaded mixture so as to mold the chopping board.

16 Claims, No Drawings

A METHOD FOR MANUFACTURING AN ANTIBACTERIAL CHOPPING BOARD

This is a divisional of application Ser. No. 08/057,677 filed May 5, 1993, now U.S. Pat. No. 5,433,424.

BACKGROUND OF THE INVENTION

The present invention relates to an anti-bacterial chopping board wherein synthetic rubber(NBR) and hard chloroethene as a basis are kneaded and further an anti-bacterial agent is mixed therewith and a method of manufacturing the same.

Hitherto, a conventional chopping board wherein an anti-bacterial agent is mixed into a chopping board of synthetic resins such as polyethylene, etc., is known as disclosed, for example, in Japanese patent publication No. 6372/1980 or Japanese patent laid-open publication No. 46464/1989.

However, according to the aforementioned conventional chopping board, single synthetic resin such as polyethylene, etc., is employed as the basis of said chopping board and an antibacterial agent is further added thereto. In the case where hard synthetic resin such as polyethylene is employed as a basis of the chopping board as above described, there was such inconvenience that the sense of soft touch of a kitchen knife to the chopping board can not be obtained. On the other hand, however, when soft synthetic resin is employed as the basis of the chopping board, some apprehensions still remained in the degree of hardness or flexural strength, etc., which is required for the chopping board. In any event, there was a problem that it was difficult to allow the sense of the chopping board material to come near the sense of a wooden chopping board.

SUMMARY OF THE INVENTION

With the above in mind, it is an object of the present invention to provide an antibacterial chopping board wherein synthetic rubber and hard chloroethene are employed as a base. It is another object of the present invention to provide a method of manufacturing the aforementioned chopping board.

The aforementioned objects can be attained by the antibacterial chopping board manufactured by the following process comprising a stiffening agent of synthetic rubber, low-pressure polyethylene resin, white carbon black as a rubber reinforcing extender, zinc flower as a rubber reinforcing accelerator, titanium as a colouring agent and stearic acid as a dispersion accelerator being compounded to the basis of synthetic rubber(NBR) and hard chloroethene as shown in the following weight compounding ratio, said compound thus obtained being kneaded under agitation by means of a kneader exclusive for rubber, ceramic powder and inorganic antibacterial agent being mixed by the following weight compounding ratio into the kneaded mixture obtainable under the agitation described above, thereby carrying out a molding operation.

| | | |
|---|---|---|
| 1. | Synthetic rubber (NBR) | 24–36% |
| 2. | Hard chloroethene | 40–56% |
| 3. | Stiffening agent of the synthetic rubber | 3–8% |
| 4. | Low-pressure polyethylene | 2–8% |
| 5. | White carbon black | 6–10% |
| 6. | Zinc flower | 1–4% |
| 7. | Titanium | 1–4% |
| 8. | Stearic acid | 0.2–0.6% |
| 9. | Ceramic powder | 2–6% |
| 10. | Inorganic antibacterial agent | 0.4–6% |

According to the antibacterial chopping board manufactured by the aforementioned method, the sense of soft touch of a kitchen knife to the chopping board and further a grain pattern in appearance having an excellent oil resistance, heat resistance, chemical resistance, weatherability and hydrophilic property can respectively be obtained due to the characteristics of the aforementioned raw materials. Thus, said chopping board with satisfactory strength and weighty sense as well has the effect of an antibacterial action due to the inorganic anti-bacterial agent.

DESCRIPTION OF THE PREFERRED EMBODIMENTS

Hereinafter, embodiment according to the present invention will be described in detail.

When a total weight of the compound of the chopping board according to the present invention is 50 kg;

1. 12–18 kg of synthetic rubber(nitrile-butadiene rubber) with excellent oil resistance (Preferably 14 kg)

In the case of less than 12 kg, the hardness of a kneaded mixture becomes too high, while on the other hand, the hardness becomes too low in the case of more than 18 kg.

2. 20–28 kg of hard chloroethene for the purpose of reinforcing a defect of synthetic rubber i.e. the degeneration of the synthetic rubber caused by ozone generated from an anti-bacterial agent due to synergistic effect with low-pressure polyethylene resin described hereinafter. (Preferably 23 kg)

In the case of less than 20 kg, the kneaded mixture lacks ozone-proof and further the hardness becomes too low, while on the other hand the hardness becomes too high in the case of more than 28 kg. An appropriate hardness of a chopping board is 85–90 degree according to the unit of a rubber hardness meter (GS 710 Type made by Teclock Co., Ltd.) and the rubber hardness of hard chloroethene is 90 degree.

3. 1.5–4 kg of high styrene as a stiffening agent of synthetic rubber, wherein 40–85% of styrene resin is mixed with styrene butadiene rubber (SBR).

In the case of less than 1.5 kg, it is impossible to ensure the appropriate hardness of a chopping board due to non-action as the stiffening agent, while on the other hand oil resistance of the chopping board is imperfect.

4. In order to ensure the appropriate hardness of the chopping board, 1–4 kg of low-pressure polyethylene resin. (Preferably 2 kg)

In the case of less than 1 kg, it is impossible to ensure the appropriate hardness of the chopping board, while on the other hand it is impossible to knead the materials due to the slide thereof in a secondary kneading process in the case of more than 4 kg. The rubber hardness of low-pressure polyethylene resin is 70 degree.

5. As a reinforcing extender, 3–5 kg of HYTRON (manufactured by Takehara Kogyo (Industries) Co., Ltd. or NIPPSEAL (manufactured by Japan Silica Industrial Co., Ltd.), which are kinds of white carbon blacks with an excellent hydrophilic property to water content required as the characteristics of a chopping board. (Preferably 3.8 kg)

In the case of less than 3 kg, the hydrophilic property on the surface of the chopping board is imperfect, while on the other hand chips generated from the chopping board on use are apt to stick to a kitchen knife or cooling materials in the case of more than 5 kg.

6. 0.5–2 kg of zinc flower as the reinforcer and dispersion accelerator of rubber. (Preferably 1 kg)

In the case of less than 0.5 kg, reinforcing and dispersion acceleration actions are imperfect, while on the other hand heavy metal(zinc) contained in the zinc flower exceeds a prescribed value in the case of more than 2 kg.

7. As a white pigment with excellent chemical resistant and weatherability, 0.5–2 kg of titanium oxide which is as metallic element. (Preferably 1 kg)

In the case of less than 0.5 kg, it is not sufficient to bring out a tone of light brown, while on the other hand the tone has more white than the other colors on the whole in the case of more than 2 kg.

8. 0.1–0.3 kg of stearic acid as the dispersion accelerator of rubber. (Preferably 0.2 kg)

In the case less than 0.1 kg, a dispersion acceleration action is not sufficient, while on the other hand the vulcanization of synthetic rubber is generated in a first and a secondary kneading processes in the case of more than 0.3 kg and therefore a final finishing operation of vulcanizing the synthetic rubber in a further thermal press process in imperfect.

9. 1–3 kg of ceramic powders (with the effect of a far infrared ray ) as the dispersion accelerator of rubber. (Preferably 1.6 kg)

In the case of less than 1 kg, a dispersion acceleration action is not sufficient, while on the other hand chips generated from a chopping board on use are apt to easily stick to a kitchen knife or cooking materials in the case of more than 3 kg.

10. When an inorganic anti-bacterial agent, which is the basis of an antibacterial effect, e.g. 0.2–3 kg of BACTE-KILLER (Japanese Trademark Registration No. 1,712,881, manufactured by (Kanebo Co., Ltd an inorganic agent forming the basis of an antibacterial effect), preferably 0.4 kg, are kneaded into the basis of synthetic rubber and hard chloroethene, thereby displaying an antibacterial action in a uniformly and evenly dispersed state in the mixture. Said inorganic antibacterial agent is powdered zeolite, wherein one or the whole of metals contained in said zeolite is substituted by at least one kind of ion exchangeable metals selected from the group consisting of Ag,Cu and Zn.

a. The material thus obtained under kneading as described above is agitated by means of a kneader exclusive for rubber. At that time, a suitable temperature is 80°–100° C. In the case of a higher temperature than the above, rubber property is excessively parched and thus rubber component becomes vulcanized rubber from crude rubber, thereby impeding the fusion of rubber and resin in a further molding process.

In the case of less temperature than the above, the material is not fused and as a result the mixture under agitation is not suffice even after a necessary time is passed. At that time, the time necessary for mixture under kneading by means of the a kneader is 10–20 minutes around. ( First kneading process ) Ceramic powder and inorganic antibacterial agent are kneaded with the mixture in 6–7 minutes after commencement of this first kneading process.

b. The material thus mixed under kneading by means of a kneader is further kneaded by means of a rubber roll in order to heighten the density of a high polymer. (secondary kneading process) That is to say, at first the distance of rolls is set to be 5–6 mm so as to knead the mixture for 4–7 minutes and subsequently said distance is further reset to be 1.5–3 mm to knead the material so as to press it easily and then the be 1.5–3 mm to knead the material so as to press it easily and then the material wound about the roll is taken out partially by cutting. (Sheeting)

c. The material thus taken out is arranged to a suitable size in conform to a die by cutting said material in length and width by means of a cutting machine. (Cutting process)

d. The material thus cut is charged into a die of a hydraulic press machine so as to actuate thermal press under 190–210 kg/cm$^2$ preferably 200 kg/cm$^2$. (Thermal pressing process)

As an example, in the case of a standarized article (40 cm length ×24 cm width×1.4 cm thickness), a suitable temperature of the thermal press is 150°–170° C. and a suitable time for pressing is 5–20 minutes, preferably 5–10 minutes in view of a production. When the standard of a chopping board is changed, each required condition may suitably be changed on the base of the standardized article as above described.

e. The product taken from thermal press is suitably shaped by cutting burrs adhered to the sides of said product by means of a cutter knife etc and then is cooled for 5–10 minutes after putting the die exclusive for cooling. (Cooling process)

At that time, a temperature of said die is thermally controlled by means of a spot cooler, etc., in order not to exceed the maximum temperature 40° C. (A prescribed maximum value of a cooling temperature is suitably arranged within the range from one third—one fourth of a first thermal press).

f. The product taken out after cooling is shaped depending upon an individual size and a chopping board with 90% of the finished article can be obtained.

Next, since the surface of said chopping board is slippery, said surface is ground by means of a grinder so as to refrain cooking materials such as meats, vegetables, fish, etc., from slipping on the surface thereof, so that a stable operation of a kitchen knife may be possible. (Grinding process)

A grain pattern can be brought about on the surface of the chopping board by grinding the surface thereof by means of a grinder in spite of a product made of synthetic rubber, so that an appearance can be considerably be improved. The surfaces of the chopping board have a grain pattern in appearance like a wooden chopping board.

Definitely, it is suitable to employ abrasives obtainable for the roughness of abrasives grain size No. 40–80 (abrasives in which aluminium oxide etc is bounded to nylon material or a sandpaper etc).

Lastly, chips generated by grinding which sticks to the surface of a chopping board is cleaned out and further the peripheral corners of the chopping board are filed for planing off the corner smooth so as to complete the chopping board as a final product. The chopping board thus obtained has an excellent sense of use and appearance which could not be obtained by a conventional antibacterial chopping board. The antibacterial chopping board presents the sense of soft touch to a kitchen knife.

According to a conventional extrusion molding, it was difficult to carry out due to considerable differences of hardness of material and melting temperature, but according to the chopping board of the present invention, an accurate and neat chopping board can be obtained one by one by the press molding.

What is claimed is:

1. A method of manufacturing an anti-bacterial chopping board comprising the steps of:

mixing a stiffening agent of synthetic rubber, low-pressure polyethylene resin, white carbon black as a rubber reinforcing extender, zinc flower as a rubber reinforcing accelerator, titanium as a rubber coloring agent and stearic acid as a rubber dispersion accelerator with synthetic rubber and hard chloroethene, kneading the mixture thus obtained under agitation by means of a kneader exclusive for rubber, mixing ceramic powder and an inorganic antibacterial agent which is powdered zeolite wherein one or the whole of metals contained in said zeolite is substituted by at least one kind of ion exchangeable metals selected from the group consisting of Ag, Cu, and Zn into the kneaded mixture obtained as above described, and carrying out a molding process with the thus-kneaded mixture to form the antibacterial chopping board, wherein the above ingredients are mixed under the following weight compounding ratios:

| | | |
|---|---|---|
| 1. | synthetic rubber | 24-36% |
| 2. | hard chloroethene | 40-56% |
| 3. | stiffening agent of the synthetic rubber | 3-8% |
| 4. | low-pressure polyethylene | 2-8% |
| 5. | white carbon black | 6-10% |
| 6. | zinc flower | 1-4% |
| 7. | titanium | 1-4% |
| 8. | stearic acid | 0.2-0.6% |
| 9. | ceramic powder | 2-6% |
| 10. | inorganic anti-bacterial agent | 0.4-6%. |

2. The method of manufacturing the antibacterial chopping board according to claim 1, wherein said mixture of the stiffening agent for synthetic rubber, low-pressure polyethylene resin, white carbon black as a rubber reinforcing extender, zinc flower as a rubber reinforcing accelerator, titanium as a rubber coloring agent and stearic acid as a rubber dispersion accelerator, being mixed with the basis of synthetic rubber and hard chloroethene under the weight compounding ratios is kneaded under agitation for 10–20 minutes by means of a kneader exclusive for rubber (first kneading process), said ceramic powder and inorganic antibacterial agent having the weight compounding ratios being kneaded with said mixture 6–7 minutes after the commencement of said first kneading process, the kneaded material being transferred in between two rubber rolls arranged to have a distance of 5–6 mm therebetween so as to knead said material for 4–7 minutes repeatedly by means of the rubber rolls and further the distance between said rubber rolls being adjusted to be 1.5–3 mm just prior to taking out the kneaded material second kneading process), the kneaded material wound about said rubber rolls being taken therefrom by releasing from the rolls and further cutting said material to conform to a prescribed size by means of a cutting machine (cutting process), the material thus cut being charged into a die of a hydraulic press machine and further being pressed under 190–210 kg/cm$^2$ pressure at a temperature from 150°–170° C. for 5–20 minutes (thermal press process), the material thus thermally pressed being taken out of the die so as to remove burrs and subsequently being charged into a die exclusive for cooling so as to carry out a cooling process for 5–10 minutes on the condition not exceeding the prescribed highest temperature 40° C. (cooling process), and slippery front and reverse surfaces of a chopping board being roughened by means of a grinder (grinding process) and chips sticking to the chopping board caused by grinding being cleaned and further peripheral corners thereof being filed (finishing process).

3. The method of manufacturing the antibacterial chopping board according to claim 1 wherein chopping boards are obtained one by one by press molding.

4. A method of manufacturing an antibacterial chopping board comprising the combination of the following ingredients 1–10 in the following weight percents based upon total weight of the combination:

| Ingredient | Weight Percent |
|---|---|
| 1. Nitrile-butadiene rubber (NBR) | 24–36 |
| 2. Hard chloroethene | 40–56 |
| 3. Stiffening agent for the NBR | 3–8 |
| 4. Low-pressure polyethylene | 2–8 |
| 5. Carbon black | 6–10 |
| 6. Zinc flower | 1–4 |
| 7. Pigment | 1–4 |
| 8. Stearic acid | 0.2–0.6 |
| 9. Ceramic powder | 2–6 |
| 10. Inorganic antibacterial agent | 0.4–6 | prepared by the steps of mixing (1) the NBR with (2) the hard chloroethene, (3) stiffening agent for the NBR, (4) low-pressure polyethylene, (5) carbon black, (6) zinc flower, (7) pigment and (8) stearic acid, kneading the resulting mixture under agitation with a kneader exclusive for rubber, mixing (9) the ceramic powder and (10) inorganic antibacterial agent into the kneaded mixture and further kneading the same, and pressing the resulting kneaded mixture in a die to form the antibacterial chopping board.

5. The method of claim 4, wherein (10) the inorganic antibacterial agent is powdered zeolite containing an ion exchangeable metal selected from the group consisting of Ag, Cu, and Zn.

6. The method of claim 4, wherein (3) the stiffening agent for NBR is 40–85% of styrene resin mixed with styrene butadiene rubber (SBR), (5) the carbon black is selected from white carbon blacks, and (7) the pigment is titanium oxide.

7. The method of claim 4, wherein the mixture of (1) NBR, (2) hard chloroethene, (3) stiffening agent for the NBR, (4) low-pressure polyethylene, (5) carbon black, (6) zinc flower, (7) pigment and (8) stearic acid is kneaded under agitation for 10–20 minutes, (9) the ceramic powder and (10) inorganic antibacterial agent are mixed and kneaded with the resulting mixture 6–7 minutes after commencement of said previous kneading step, and comprising the additional steps of transferring the resulting kneaded mixture to between two rubber rolls arranged at a distance of 5–6 mm. from each other and kneading the resulting mixture therebetween for 4–7 minutes in a second kneading step, adjusting the distance between the two rubber rolls to 1.5–3 mm. just prior to completion of said second kneading step, releasing the kneaded material wound about the rubber rolls and cutting the material to a prescribed size with a cutting machine, charging the cut material into a die of an hydraulic press machine and pressing the material at 190–210 kg/cm$^2$ pressure and 150°–170° C. temperature for 5–20 minutes, removing the pressed material from the die so as to remove burrs therefrom and charging the pressed material into a second cooling die in which the material is cooled for 5–10 minutes at a temperature not exceeding 40° C. to form the solidified chopping board, roughening front and reverse surfaces of the solidified chopping board with a grinder, and cleaning off chips sticking to the chopping board caused by the grinding and filing peripheral corners of the chopping board.

8. The method of claim 7, wherein (10) the inorganic antibacterial agent is powdered zeolite containing an ion exchangeable metal selected from the group consisting of Ag, Cu, and Zn.

9. The method of claim 1, wherein (3) the stiffening agent for NBR is 40–85% of styrene resin mixed with styrene butadiene rubber (SBR), (5) the carbon black is selected from white carbon blacks, and (7) the pigment is titanium oxide.

10. The method of claim 7, wherein the surfaces of said chopping board are provided with a grain pattern in appearance similar to a wooden chopping board.

11. The method of claim 7, wherein chopping boards are obtained, one by one, by press molding.

12. The method of claim 6, wherein (3) the stiffening agent comprises 40–85% of styrene resin mixed with styrene butadiene rubber.

13. The method of claim 4, wherein a chopping board having hardness of 85–90 degree is provided with the hardness of (2) the chloroethene being 90 degree.

14. The method of claim 4, wherein the ingredients 1–10 are blended together to provide a uniform mixture in the weight percents based on the total mixture.

15. The method of manufacturing the anti-bacterial chopping board according to claim 1 wherein the synthetic rubber is nitrile-butadiene rubber (NBR).

16. The method of manufacturing the anti-bacterial chopping board according to claim 2 wherein the synthetic rubber is nitrile-butadiene rubber (NBR).

\* \* \* \* \*